Dec. 9, 1952 J. B. ROSENTHAL 2,620,847
FRAME CLAMPING PRESS FOR HANDBAGS
Filed March 20, 1950 4 Sheets-Sheet 1
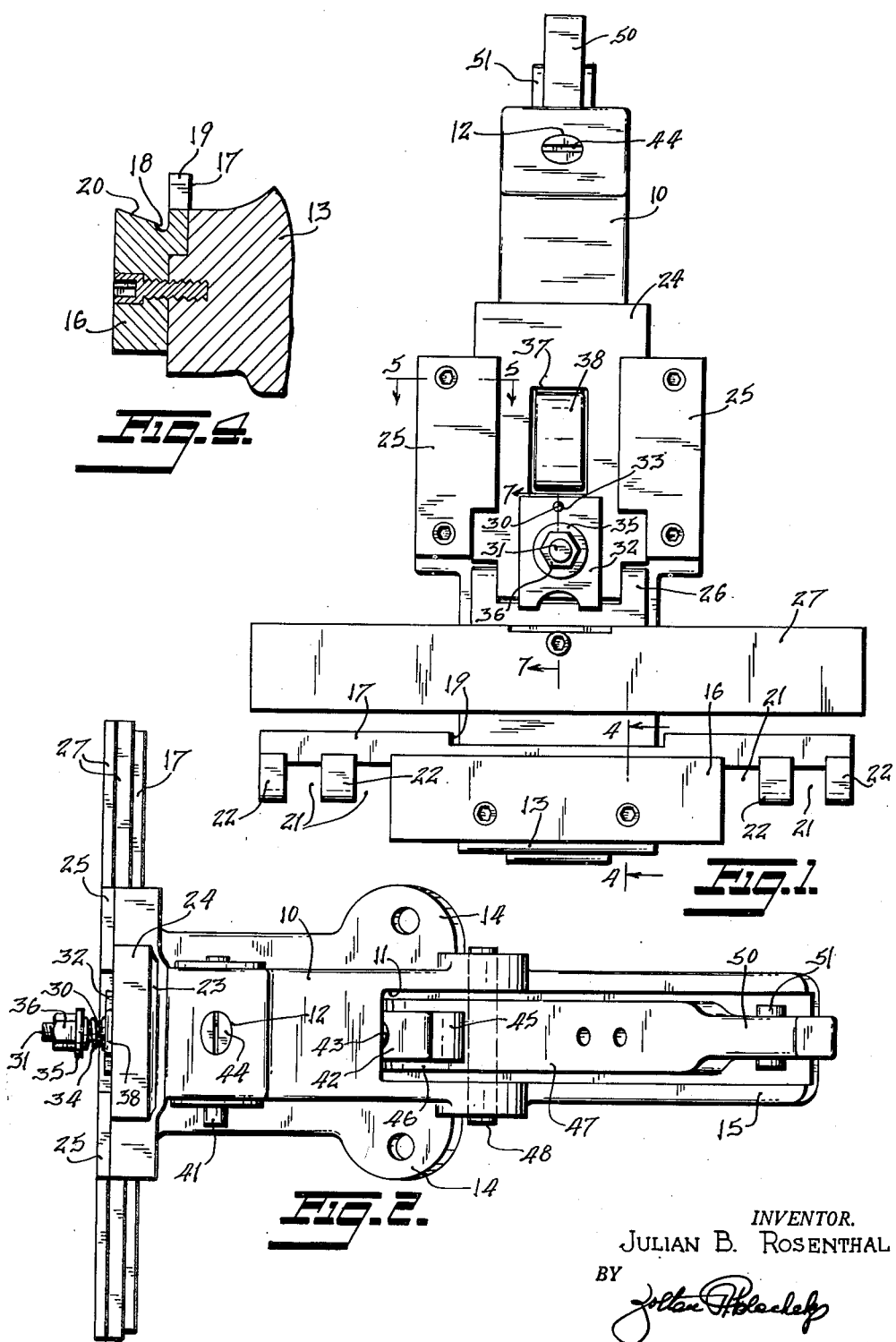
INVENTOR.
JULIAN B. ROSENTHAL
BY
*Julian Holsclaw*
ATTORNEY

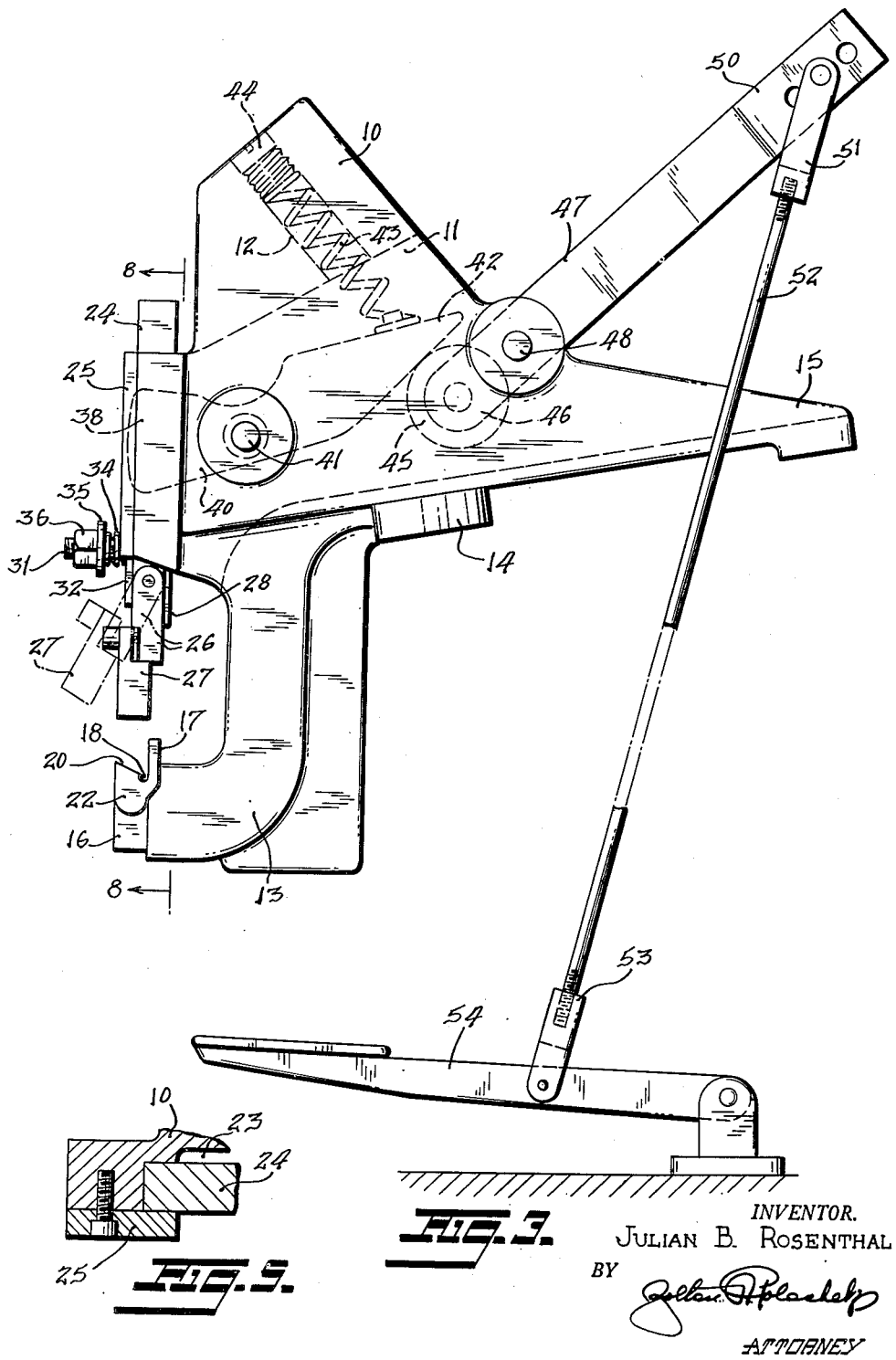

Dec. 9, 1952 J. B. ROSENTHAL 2,620,847
FRAME CLAMPING PRESS FOR HANDBAGS
Filed March 20, 1950 4 Sheets-Sheet 3
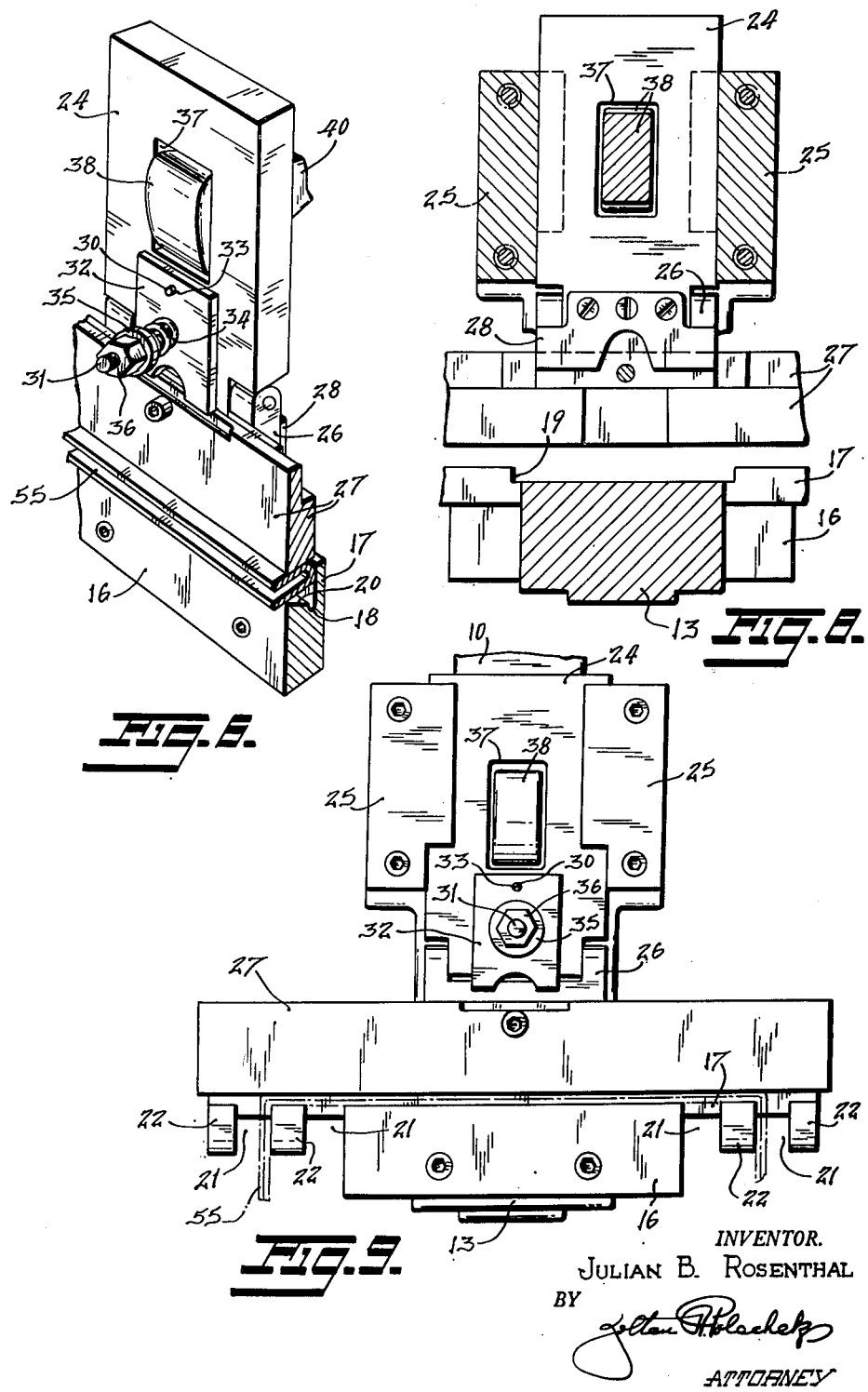
INVENTOR.
JULIAN B. ROSENTHAL
BY
ATTORNEY Dec. 9, 1952  J. B. ROSENTHAL  2,620,847
FRAME CLAMPING PRESS FOR HANDBAGS
Filed March 20, 1950  4 Sheets-Sheet 4

INVENTOR.
JULIAN B. ROSENTHAL
BY
ATTORNEY

Patented Dec. 9, 1952

2,620,847

UNITED STATES PATENT OFFICE 2,620,847

FRAME CLAMPING PRESS FOR HANDBAGS

Julian B. Rosenthal, Bronx, N. Y.

Application March 20, 1950, Serial No. 150,653

3 Claims. (Cl. 153—1)

This invention relates to presses for clamping handbag body materials to handbag jaws and pertains particularly to such devices in which provisions are made for avoiding damage to clasps or latches which may be preformed on said jaws.

One object of the present invention is to provide means for effectively operating male and female die members to thereby clamp handbag materials securely in handbag jaw members of U-shaped cross sections.

Another object of the present invention is to provide means whereby the male die member of a male and female die arrangement may be manually removed from the path in which it cooperates with the said female die.

Another object of the present invention is to provide in a male and female die arrangement in which means are provided whereby the male die may be manually removed from its effective path, other means for automatically restoring the removed male die upon its release.

Still another object of the present invention is to provide a female die member of such construction as to be able to guide the object upon which it is to operate.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of the present apparatus illustrating certain of the composing elements and the relative dispositions thereof.

Fig. 2 is a plan view of the present apparatus showing the manner in which the operating lever is pivoted in the head member.

Fig. 3 is a side elevational view showing the composing elements in their inoperative positions.

Fig. 4 is a fragmentary sectional view taken along the lines 4—4 in Fig. 1 and illustrates the mounting of the female die to the pendent head member extension.

Fig. 5 is a fragmentary sectional view taken along the lines 5—5 in Fig. 1 and illustrates the means provided for retaining the slide member.

Fig. 6 is a fragmentary isometric view showing the slide, yoke, male and female die arrangement, and the manner in which the work piece is positioned between said dies.

Fig. 8 is a fragmentary sectional view taken along the lines 8—8 in Fig. 3 and shows the slide and yoke arrangement and the yoke limit stop.

Fig. 9 is a front view showing the apparatus with the male die in its lowered operative position.

Figures 7, 10:
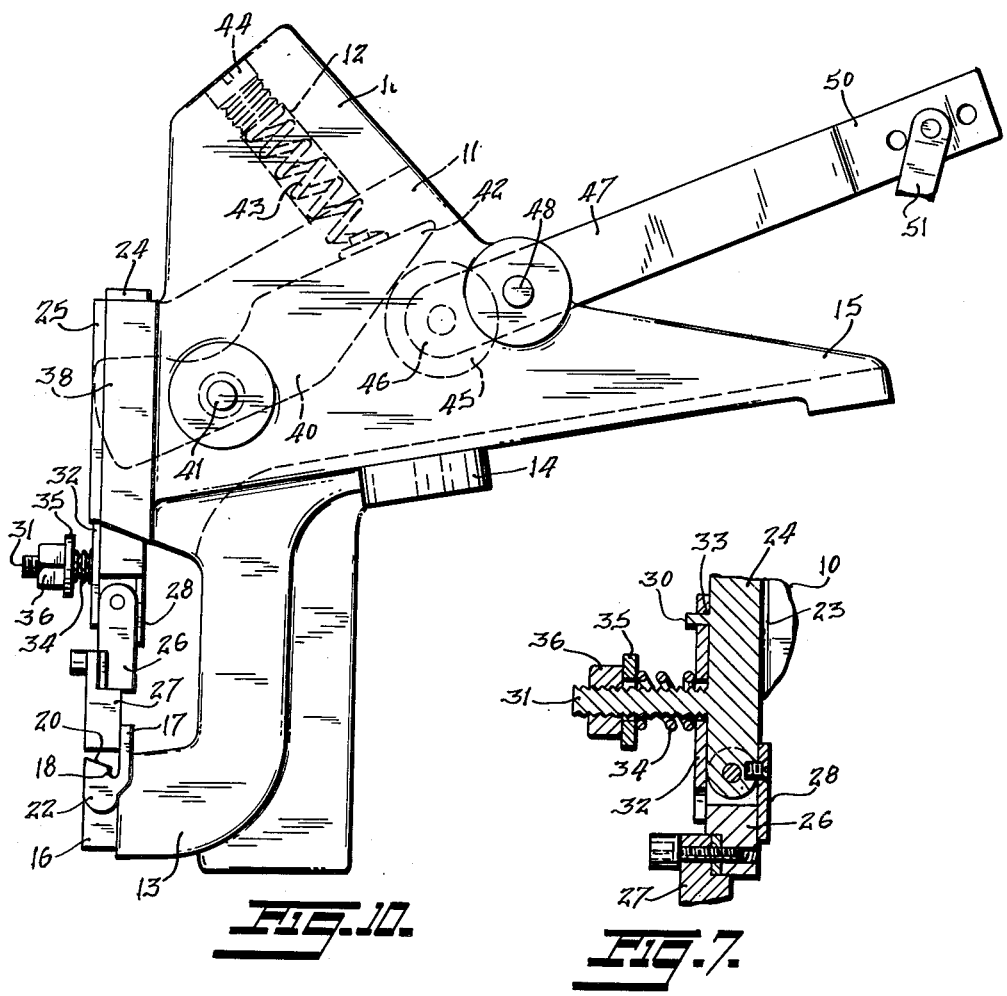
Fig. 7 is a fragmentary sectional view taken along the lines 7—7 in Fig. 1 and illustrates the slide and yoke arrangement and the resilient restoring means therefor.
Fig. 10 is a side elevational view wherein the male die is seen in its lowered operative position.

The frame clamping press for handbags, according to the present invention, includes a cast head member 10 which is configured to provide a recess 11, a downwardly extending bore 12, a pendent extension 13, mounting pads 14, and a rear extension 15.

Secured to the front face of the said pendent extension 13, by means of Allen head cap screws or similar fasteners, is a female die 16 (Figs. 1, 3 and 4), which is formed to provide a rear upwardly extending wall 17, a semi-circular channel 18, a wall cut-out 19 and an inclined face 20. Said female die is also provided with vertical cutouts 21 which have the effect of forming lugs 22, the purpose for which will be described hereinafter.

Provided in the body portion of the head member 10 is a vertical shallow channel 23 (Fig. 2), which channel is adapted to receive a slide 24 (Figs. 1, 2 and 3). In order to retain said slide 24 in said channel 23 in a sliding relation with said head, retaining plates 25 are provided and fastened to the front body face of said head member, also by means of Allen cap screws or similar fasteners (Figs. 1, 2 and 5).

Now, as particularly well seen in Figs. 1, 3 and 6, the said slide 24 is reduced at its lower end, whereat there is pivotally connected a yoke 26, which yoke has removably secured to the lower front portion thereof a male die 27. Adapted to engage the yoke 26 and be thereby effective to limit the rearward pivotal movement of said yoke and male die is a limit stop 28 secured to the lower rear portion of the aforementioned slide 24 (Figs. 3, 7 and 8).

Now, with reference to Figs. 1, 6 and 7, it will be seen that the slide 24 is also provided with a forwardly extending pin 30 and similarly extending threaded stud 31. Provided to fit slidably on said stud 31 is a restoring plate 32, which plate is maintained vertical by the seating in a hole 33 therein of the pin 30. A spring 34, carried on said stud 31 and retained thereon by a washer 35, and a nut 36, urges said restoring plate 32 to engage the forward side of the yoke 26 and thereby resiliently limit the forward pivotal movement thereof.

In order that the slide 24 may be moved downwardly to effect the cooperation of the male and female dies, the slide 24 is provided with an aperture 37. Provided to fit in said aperture 37 is the forward arm 38 of an actuating lever 40 pivoted as at 41 in the head member 10 (Figs. 1, 2, 3 and 6). It will be seen that a counterclockwise rocking movement of said actuating lever 40 will effect the association of the arm 38 thereof with the lower end of the aperture 37, to thereby move the slide 24 downwardly and effect the cooperation between the said male and female dies. Now, inasmuch as it is desirable that the slide 24 be normally held in a raised ineffective position, a rear arm 42 of the actuating lever 40 is connected to an expansion spring 43 housed in the bore 12 of the head member 10 and retained therein by a threaded cap 44. The spring 43 normally urges said actuating lever to its most clockwise position in which the forward arm 38 thereof associates with the upper end of the slide aperture 37 and holds the slide 24 in its raised ineffective position.

Provided to engage the under side of the rear arm 42 of the actuating lever is a roller 45 carried on the forward arm 46 of an operating lever 47 pivoted as at 48 in the head 10 (Figs. 2, 3 and 10). Pivotally connected at the end of a rearwardly extending arm 50 of the operating arm 47 is a yoke member 51. A connecting rod 52 effectively connects said member 51 with a second yoke member 53 pivotally secured to a treadle or foot pedal 54. It will be seen that a downward movement of the treadle 54 will rock the operating lever 47 clockwise which will effect the counterclockwise rocking of the actuating lever 40 against the tension of the spring 43 to thereby cause the slide 24 to move downwardly and bring the male die 27 in cooperation with the female die 16 (Figs. 9 and 10). It will be seen, also, that the release of the treadle will be effective to permit the spring 43 to return all of the elements to their inoperative positions.

The present apparatus is adapted to be affixed to the edge of a table or bench by means of the mounting pads 14, and the treadle 54 is adapted to be disposed fixedly on the floor or a base beneath said table or bench. The work pieces adapted to be operated on by the present apparatus are of U-shaped cross sections and are designated 55 in Figs. 6 and 9. Now inasmuch as the said work pieces 55 are often provided with latches or clasps before the handbag material is secured thereto, it is imperative to provide means for clamping said bag material between the U-shaped work pieces without damaging the already attached clasps or latches. To this end, the yoke 26, and therefore the attached male die 27, may be pivoted outwardly to the position seen in broken lines in Fig. 3 against the tension of the spring 34 acting on the restoring plate 32. This arrangement permits the said clasps to be positioned behind the said male die 27, and in the wall cut-out 19 in the female die 16. Thereafter, the male die is released and the restoring plate 32 is effective for pivoting it backwardly to the normal effective position thereof. The hereinabove mentioned vertical cut-outs 21 in said female die permit the work pieces 55 to be guidingly supported over the inclined face 20 of said die in a position in which the clasps thereon will be in the cut-out 19 until the mentioned foot treadle 54 is depressed and the various components are effective to bring the said male die in cooperation with the female die (Figs. 9 and 10). In this manner the U-shaped pieces are pressed together and the bag material is held therein without doing damage to the mentioned bag clasps.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. In a device for pressing handbag frames having a fixedly mounted female die member and a normally raised slide slidably mounted to move toward and away from the female die member, a yoke pivotally mounted on the bottom end of the slide, a male die member fixedly mounted on the bottom end of said yoke in vertical alignment with the female die member, a stop member dependent from the slide along one side of the yoke restricting pivoting of the yoke in the direction of said stop member, and resilient means dependent from the slide along the other side of said yoke holding said yoke in a pivoted position in which said male die member is aligned with the female die member, said resilient means comprising a threaded stud extended from the slide above the other side of said yoke, a restoring plate carried by said stud and depending along the other side of said yoke, a nut threaded on the outer end of said stud, and a spring on said stud operating between said restoring plate and said nut holding said restoring plate in an operative position.

2. In a device for pressing handbag frames having a fixedly mounted female die member and a normally raised slide slidably mounted to move toward and away from the female die member, a yoke pivotally mounted on the bottom end of the slide, a male die member fixedly mounted on the bottom end of said yoke in vertical alignment with the female die member, a stop member dependent from the slide along one side of the yoke restricting pivoting of the yoke in the direction of said stop member, and resilient means dependent from the slide along the other side of said yoke holding said yoke in a pivoted position in which said male die member is aligned with the female die member, said resilient means comprising a threaded stud extended from the slide above the other side of said yoke, a restoring plate carried by said stud and depending along the other side of said yoke, a nut threaded on the outer end of said stud, and a spring on said stud operating between said restoring plate and said nut holding said restoring plate in an operative position, and means holding said restoring plate from pivoting about said threaded stud.

3. In a device for pressing handbag frames having a fixedly mounted female die member and a normally raised slide slidably mounted to move toward and away from the female die member, a yoke pivotally mounted on the bottom end of the slide, a male die member fixedly mounted on the bottom end of said yoke in vertical alignment with the female die member, a stop member dependent from the slide along one side of the yoke restricting pivoting of the yoke in the direction of said stop member, and resilient means dependent from the slide along the other side of said yoke holding said yoke in a pivoted position in which said male die member is aligned with the female die member, said resilient means comprising a threaded stud extended from the slide above the other side of said yoke, a restoring plate carried by said stud and depending along the other side of said yoke, a nut threaded on the outer end of said stud, and a spring on said stud operating between said restoring plate and said nut holding said restoring plate in an operative position, and a pin extended from the slide above said threaded stud, said restoring plate having a hole above said threaded stud into which said pin extends for holding said restoring plate from pivoting about said threaded stud.

JULIAN B. ROSENTHAL.

REFERENCES CITED

The following references are of record in the file of this patent:

UNITED STATES PATENTS

| Number | Name | Date |
|---|---|---|
| 1,692,684 | Nees | Nov. 20, 1928 |
| 1,909,780 | Balsam | May 16, 1933 |
| 1,920,780 | Cardinale | Aug. 1, 1933 |
| 1,960,799 | Sieg | May 29, 1934 |
| 2,352,855 | Molnar | July 4, 1944 |
| 2,396,562 | Forss | Mar. 12, 1946 |

FOREIGN PATENTS

| Number | Country | Date |
|---|---|---|
| 137,126 | Australia | Apr. 10, 1934 |